March 11, 1969     M. J. GREAVES ET AL     3,432,287

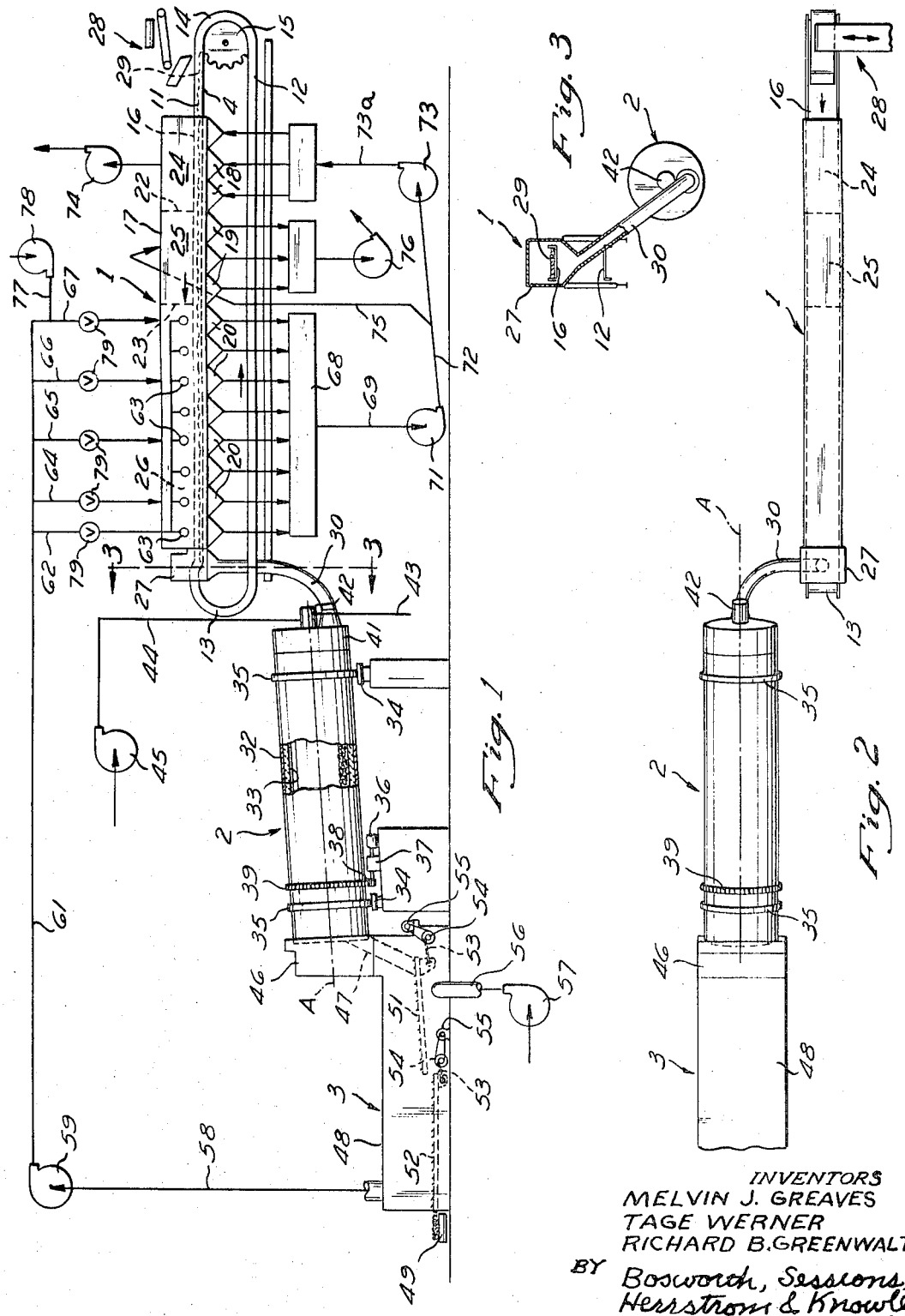

AGGLOMERATION METHOD AND APPARATUS

Filed March 11, 1966

INVENTORS
MELVIN J. GREAVES
TAGE WERNER
RICHARD B. GREENWALT
BY Bosworth, Sessions,
Herrstrom & Knowles
ATTORNEYS No. 3,432,287
Patented Mar. 11, 1969

3,432,287
AGGLOMERATION METHOD AND APPARATUS
Melvin J. Greaves, Cleveland, Tage Werner, Rocky River, and Richard B. Greenwalt, Parma, Ohio, assignors to Arthur G. McKee & Company, Cleveland, Ohio, a corporation of Delaware
Filed Mar. 11, 1966, Ser. No. 533,475
U.S. Cl. 75—5                18 Claims
Int. Cl. C21b 1/10; F21b 21/02; C22b 1/16

ABSTRACT OF THE DISCLOSURE

Method and apparatus for producing pellets from finely divided pelletizing material according to which green balls of pelletizable material are formed into a moving body in which the balls are at rest relative to each other, as on a traveling grate, and while in such moving body the balls are dried and then subjected to pelletizing conditions including high temperature sufficient to convert the balls into essentially completely heat-hardened pellets, after which the pellets without cooling are discharged into a tumbling zone as in a rotating kiln and tumbled under indurating temperatures for a period sufficient to render the pellets essentially uniform as to hardness before they leave the tumbling zone. The pellets thereafter are preferably discharged into a cooling zone. Preferably, heated air from the cooling zone is used as combustion air in the indurating zone, and heated gases from the indurating zone are used for drying purposes.

---

This invention relates to the agglomeration of finely divided materials, such as ores or other metal compounds, by heating, and more particularly to method and apparatus for heating such materials to agglomerate them.

While the invention may be advantageously used in various types of agglomeration of various kinds of finely divided pelletizable materials, it will be discussed below primarily in connection with pelletizing iron ore to form heat hardened pellets having sufficient strength and hardness to permit them to be handled, shipped, stored and charged into blast furnaces or other smelting apparatus. The method and apparatus of the invention provide particular advantages in such uses.

In the production of such heat hardened iron ore pellets, water and finely divided ore, beneficiated ore concentrate, flue dust, or other iron-bearing material, either alone or with particles of solid fuel, flux materials or other substances, are mixed together to form a moist mud-like mass which is then formed into green balls by any known means. To as great an extent as possible, these balls are of a uniform desired size, usually between about ¼" to about 1" in diameter, and preferably between about ⅜" to about ½" in diameter. Pelletizing, involving proper drying and heating of these balls, will remove the moisture and strengthen them by heat hardening them so that they may thereafter be handled, shipped, stored and charged by conventional apparatus. Horizontal traveling grate machines and certain grate-kiln machines have been the most widely used types of pelletizing machines.

The typical horizontal traveling grate pelletizing machine comprises a number of wheeled pallets that travel along a straight horizontal track while in abutting relation to define a straight, continuous channel-cross sectioned material-carrying grate having a permeable bottom and upwardly-extending confronting sidewalls. In a typical pelletizing operation on such a machine, the green balls are deposited in a layer or bed of predetermined thickness at the charging end of such grate. The balls on the grate are subjected to drying, high temperature heating, and cooling as the grate moves through the several zones of the pelletizing machine, being completely heat hardened and cooled before being discharged from the grate as product. These treatments involve passing air in the cooling zone, and hot gases in the other zones, through the bed of balls on the grate, either downdraft or updraft or in a combination of downdraft and updraft gas flows.

The typical grate-kiln type of pelletizing machine has a short straight traveling grate having a permeable bottom hearth and upwardly-extending confronting sidewalls, the grate usually being a chain grate. Green balls are deposited in the grate and travel on the grate through drying and preheating zones which partially harden the balls; the partially hardened balls are discharged from the grate into a kiln that rotates about an axis inclined downwardly from its receiving end to its discharge end, where the heat hardening is completed, after which the balls pass to a cooler. Hot combustion gases are introduced into the kiln at its discharge end to complete the heat hardening of the balls as they tumble in the kiln; to conserve heat, the gases leaving the kiln pass one or more times through the balls on the grate in the heating operations that are performed on the grate.

Each of these prior types of machines utilizing grates has been susceptible of certain disadvantages difficult to overcome. In the ordinary horizontal grate machine in which the pellets are completely treated on the grate and then cooled before being discharged from the grate, it is difficult to maintain absolutely uniform processing conditions laterally across all cross sections of the grate in each treating zone, due to the effects of the sidewalls in changing gas flow and in modifying transfer of heat to or from pellets near the sidewalls. Similarly, the bottom of the grate affects the processing of pellets near the bottom differently from those more remote from the bottom. This tends to cause the pellets discharged from the grate to be of nonuniform quality, and in particular the pellets adjacent the sidewalls to be of inferior quality, unless special precautions are taken, such as the provision of sidelayers and hearth layers of preburned pellets or of reject pellets that must be separated from usable product pellets. These precautions add complexity and expense to construction and operation of the apparatus.

In the conventional grate-kiln apparatus, in which the pellets are only partially hardened on the grate and then are discharged into the kiln in which the hardening is to be completed, difficulties arise because of degradation or breakage of the incompletely hardened pellets as they are tumbled in the kiln, which results in undesirable formation in the kiln of rings out of materials produced from degradation or breakage of the pellets. Such ringing adversely affects the flow, tumbling, and heat treatment of pellets in the kiln and frequently must be removed. Removal of the rings while the kiln is operating requires shooting of projectiles into the kiln to knock off rings, which requires careful aim and nevertheless often damages the kiln lining. When the kiln is shut down to remove rings or repair lining damage, costly loss of production time results. Because of pellet degradation in the kiln the adverse effects of ring formation, and often insufficient induration, the pellet quality is harmfully affected. For these reasons, and because the pellets are held together essentially only by hematite recrystallization, such pellets frequently develop dimensional instability and disintegrate structurally under the relatively low temperature reducing conditions in the blast furnace, so that a large part of the iron units of the pellet material is wasted as flue dust rather than recovered as metallic iron. Moreover, since the heat hardening is completed in the kiln, the kiln must be exceptionally long and of large diameter. This adds costs because of the cost of the lengthy, large diameter kiln and the plant space to house it. Moreover, large quantities of fuel must be burned in the kiln in order to effect the desired completion of heat hardening, and large volumes of hot gases must move through and out of the kiln. In order to prevent undue loss of the heat in these gases, it has been the practice to pass the gases, after they leave the kiln, one or more times through the balls on the grate in order to transmit to the balls some of the heat that would otherwise be wasted; this requires the movement of large volumes of hot gases to and through the grate with consequent high costs of construction for large refractory lined or exteriorly insulated ducts. Consequently such prior grate-kiln systems have not had as good heating efficiency as desired.

A third type of pelletizing machine that has been used is the shaft furnace in which green balls while in a deep body are caused to move downwardly through a vertical furnace while heating gases are passed upwardly through the body of balls. This type of machine has not been as widely used as the other types, because of the relatively low limit on the capacity of each machine and because it has been difficult to achieve desired uniformity of pellet quality because of the difficulties of insuring uniform gas flow across the cross section of the deep body of pellet in the furnace. Furthermore, other limitations on usage of these machines have arisen because it is difficult, if not impossible to achieve in them the high temperatures necessary for adequate pelletizing of hematite materials.

It is an object of the present invention to provide method and apparatus that will overcome all, or as many as desired, of the above indicated disadvantages of prior pelletizing methods and apparatus. A further object is the provision of method and apparatus for producing high quality heat hardened pellets of a superior quality and superior uniformity of quality. Another object is the provision of grate-kiln apparatus and method which provides improved heat, fuel and operating power economy. A further object is the provision of apparatus that has substantially improved durability over, and that can be operated for longer periods without shut down than, prior grate-kiln apparatus. Another object is the provision of apparatus which can be built to have large production capacities and lower per-ton product costs of installation than prior grate-kiln apparatus.

These and other objects will become apparent from the following description of a preferred embodiment of the invention in conjunction with the accompanying drawings in which:

FIGURE 1 is a diagrammatic side elevation of apparatus embodying the invention;

FIGURE 2 is a diagrammatic plan of the apparatus of FIGURE 1 and to the same scale;

FIGURE 3 is a diagrammatic cross sectional view from line 3—3 of FIGURE 1;

FIGURE 4 is a side elevation to a considerably enlarged scale of the discharge portion of the grate generally from line 4—4 of FIGURE 5; particularly showing preferred means for dumping hot pellets from the grate so they can discharge into the kiln, the tilting pallet and a pull bar being shown in broken lines;

FIGURE 5 is a cross section along line 5—5 of FIGURE 4 and to the same scale; and FIGURE 6 is a detail perspective showing a portion of one of the grate pellets and the end of one of the bars for positively drawing this pallet up an inclined track section of the apparatus to cause the pallet to dump.

According to the invention, green balls, which may be formed by conventional balling apparatus and techniques, are laid down by suitable apparatus, of which there are several known types, to form a gas permeable layer of uniform predetermined thickness which is moved, while the balls are at rest relative to each other, in a generally horizontal path through drying and high temperature induration zones. Preferably the layer of balls is supported and moved on a traveling horizontal grate that has a permeable bottom and upstanding sidewalls defining a channel shaped cross section. If the balls being pelletized are formed of iron ore or the like, they are preferably dried at temperatures between about 400° F. and about 850° F.; they may then be preheated at temperatures between about 800° F. and about 2100° F.; and then preferably are subjected to indurating temperatures between about 2350° F. and about 2600° F. depending upon whether sintering of the balls by fusing of the slag content thereof is desired in addition to the oxide conversions and recrystallations ordinarily resulting in induration, and upon the melting point of the gangue in the ball material. Preferably the balls are dried initially in an updraft drying zone in which hot drying gases are passed through the layer upwardly from below; and thereafter in a downdraft drying zone in which hot gases are passed downwardly through the layer from above. The downdraft drying permits higher gas temperatures to be used, thus making possible substantial preheating of the balls without damaging the support for the balls. The balls are subjected to induration temperatures by passing hot gases through the layer of balls on the grate, preferably downdraft; the desired induration temperature preferably is achieved by burning fuel, mixed with preheated primary combustion air, in preheated secondary combustion air. Preferably, the hot gases in the indurating zone on the grate, at least, are strongly oxidizing.

The balls are subjected in the indurating zone on the grate to the proper temperature and other conditions for a time sufficient to effect essentially all recrystallizations and grain growth, as well as oxide conversions or other reactions characteristic of the particular type of pelletizable material used, as well as fusing of slag forming components if sintering is desired, that result in the formation of essentially completely heat hardened pellets, before the pellets are discharged from the grate.

Without cooling, the pellets at indurating temperatures are discharged from the grate directly into a tumbling zone in which the layers of balls is disrupted and the balls are caused to move relatively to each other and to the container, such as a rotating kiln, carrying them. The pellets move through such zone at a rate correlated to the rate at which pellets are fed into such zone from the layer in which they are quiescent, so that there is an essentially constant rate of flow of balls through the drying and induration zones and of pellets through the tumbling zone.

Indurating temperatures are maintained in the tumbling zone, which is preferably a laterally-extending inclined rotary kiln, in which the pellets are tumbled so that all portions of all pellets are exposed to the indurating temperatures for a time sufficient to equalize their temperatures and provide the following effects. Since the pellets are essentially completely heat hardened and develop their maximum hot strengths before they pass into the kiln, there is little if any degradation or breakage of pellets in the kiln. In fact, finely divided oxide material in the kiln, such as might have been carried by the pellets into the kiln from the grate, can be caused to adhere to the pellets as they tumble and roll in the kiln and be permanently incorporated into the pellets by the hammering action of the tumbling and by the induration temperature. Moreover, pellets deficient in hardness or quality, as those originating near the sidewalls or hearth of the grate, are brought up to the quality of other pellets by the heating and tumbling in the kiln. Furthermore, all pellets are smoothed, fire-polished and densified in the kiln by the tumbling action and high temperature. The pellets therefore have highly uniform quality and are dense and strong when they leave the tumbling zone.

The kiln that provides the tumbling zone can be considerably shorter than those used in ordinary conventional grate-kiln machines, and can be between about 30% to 60% as long as such conventional kilns and have comparably less volume.

Preferably the heat for maintaining the indurating temperatures in the tumbling zone is supplied by hot combustion gases emitted by a burner; the burner is preferably located at the feed end of the tumbling zone, so that the hot combustion gases pass through the zone concurrently with the pellets.

The short length of the kiln makes it possible readily to remove any rings that may form in the kiln, by reaching them with suitable tools from an end of the kiln.

Since the kiln is considerably smaller and the pellets are at indurating temperature when they enter the kiln, the volume of hot gases passing through the kiln is substantially less than in conventional practice and the problem of recovery of heat from these gases and the problem of handling the gases is accordingly minimized. Furthermore, if as is desirable, the burner is mounted at the feed end of the kiln, the pellets are subjected to the highest temperatures in the kiln while they are hottest as they enter the kiln; and are partially cooled as they travel along and leave the kiln; therefore, it is not necessary to reheat partially cooled pellets to bring them up to desired high indurating temperatures, as is the case in conventional practice in which the burner is mounted at the discharge end of the kiln; and the partially cooled pellets reduce the burden on the cooler and the volume of cooling air that must be moved.

The temperatures maintained in the kiln may range from about 2350° F. to about 2600° F., depending upon the composition of the balls, whether sintering of the pellets is desired in addition to oxide conversions and oxide recrystallizations, and upon the refractoriness of the gangue material in the pellets which, by fusing, causes sintering. Preferably, reducing conditions are maintained in the kiln, as can be done in known manners by control of the air-fuel ratio of the fuel burned in the kiln. Reducing conditions in the kiln promote sintering of the pellets by lowering the temperature at which the slag-forming components of the pellets melt to form slag which aids in bonding the pellets together, thus increasing their strength and resistance to disintegration in the blast furnace. Of course, oxidizing conditions may be maintained in the kiln.

The pellets leaving the kiln are discharged into a cooling zone, which may be provided by a conventional cooler. Little if any gases pass from the kiln to the cooler; however any small volume passing from the kiln to the cooler is mixed with the heated air that results from cooling of the pellets in the cooler by ambient air introduced into the cooler so it contacts the pellets.

The heated air from the cooler, according to the invention, is preferably passed to the grate and used as drying or combustion air, preferably both primary and secondary combustion air, for the burning of the fuel, preferably gaseous or liquid, in the indurating zone. In general, for pelletizing iron ore or similar material, this air leaving the cooler may be at a temperature between about 600° F. to about 1000° F. and preferably in the neighborhood of about 800° F. By burning fuel, a desired indurating temperature of about 2350° F. to about 2600° F. and usually preferably about 2400° F. is maintained in the indurating zone of the grate, and the hot gases discharged from the indurating zone, which may be from about 350° F. to about 1250° F. and preferably about 800° F. are passed to the updraft and downdraft drying zones, after which the resulting cooled gases are passed to the stack. If desired, tempering ambient air may be added at any of the zones on the grate to mix with and reduce the temperature of the gases to which the balls are subjected.

Since a smaller volume of lower temperature, heat-laden air is handled than in conventional processes, costs of ducts for carrying the air and of fans and power for moving the air are substantially reduced; and since the heated gases from the cooler are essentially if not completely air and not spent combustion gases, heat of this can be recovered by using it as combustion air on the grate.

In apparatus embodying the invention, the grate can be considerably shorter than the grate used in horizontal grate pelletizing operations; and the kiln can be considerably shorter than in conventional grate-kiln pelletizing operations; therefore, substantial economies in machine and plant construction are possible.

In the drawings, showing in FIGURES 1, 2 and 3 a preferred form of apparatus that can be used in the invention, 1 indicates the grate portion embodying the drying and indurating zones, 2 indicates the rotating kiln portion providing the tumbling zone, and 3 indicates the cooler portion providing the cooling zone.

Grate portion 1 comprises an endless strand 4 of travelling pallets 5 (FIGURES 4 and 5) of generally conventional design, each pallet having a permeable bottom 6 made up of grate bars 7 separated by spaces 8 through which gas may pass but which are small enough to prevent escape of balls or pellets. Each pallet has rigid confronting sidewalls 9. The pallets are supported and caused to travel in a generally conventional manner in the strand 4 in an upper path 11, a lower return path 12, a curved path section 13 at the discharge end, and a curved path 14 at its charging end around drive sprocket 15. When on the upper path the pallets abut to form a continuous channel cross sectioned straight traveling grate 16 that travels from the charging end to the discharge end of the machine as indicated by the arrows, being driven by sprocket 15 rotated by suitable conventional power means not shown. The grate passes between an upper hood 17 and groups of lower windboxes 18, 19 and 20. The hood is suitably subdivided by conventional partitions 22 and 23. These partitions and groups of windboxes 18, 19 and 20 provide an updraft drying zone 24, a downdraft drying zone 25, and a downdraft high temperature indurating heating zone 26, followed by a discharge hood 27.

Green balls are formed of finely divided ore or ore concentrates, water and other ingredients, on suitable balling equipment, not shown, such as that described and claimed in J. F. Baier U. S. Patent No. 2,822,076. The green balls thus formed are discharged onto the charging end of the traveling grate 16 by suitable feeding means 28, which preferably is of the type disclosed and claimed in M. J. Greaves et al. U.S. Patent No. 3,184,037, which deposits a gas permeable layer 29 of green balls of essentially uniform predetermined thickness on the permeable hearth formed by bottom 6 and between the continuous sidewalls formed by the sidewalls 9 of abutting pallets of traveling grate 16. If desired, means may also be provided at the charging end of the grate to form a sidelayer or a hearth layer, but in general these are not required in carrying out the present invention because of the equalization of quality of pellets achieved in the kiln.

After having been carried by the grate through the various zones, the hot, essentially completely heat hardened pellets are discharged by the discharge means to be described later through a chute 30, lined with abrasive- and heat-resistant material 31, into the kiln 2. The kiln may be of conventional construction, having a generally cylindrical steel shell 32 lined with refractory material 33 defining a generally cylindrical interior. This kiln is supported on rollers 34 contacting circumferential tracks 35 fixed to the exterior of the kiln and is positively rotated about its axis A at a desired low rotational speed by motor 36 driving through gear box 37 a pinion gear 38 engaging a ring gear 39 on the kiln. The kiln is inclined from the horizontal, with its charging end higher than its discharge end, sufficiently to cause the pellets to travel through the kiln to its discharge end, the inclination of the kiln and its rotational speed being such as to provide a desired dwell of the pellets in the kiln and maintain a constant flow of pellets through the kiln correlated to the flow of pellets discharged from the grate.

At its feed end, the kiln has a housing 41, closing the charging end of the kiln, through which the chute 30 carrying hot pellets from the grate introduces such pellets into the kiln. A burner 42 is mounted on housing 41 to discharge its flame and hot products of combustion into the charging end of the kiln. This burner is a conventional type supplied with fuel, such as oil or gas, through pipe 43, and with primary and secondary combustion air through conduit 44 and fan 45.

The pellets leaving the kiln discharge through housing 46 and chute 47 thereon into a suitable cooler. In the illustrated embodiment this is a commercially available Model 1460 cooler manufactured by Fuller Company of Catasauqua, Pa. This cooler, as diagrammatically shown, comprises an elongated metal enclosure 48, through which the pellets are transported to belt 49 or other means for receiving and transporting away the cooled product pellets, by gas permeable conveyer members 51 and 52 vibrated longitudinally of the cooler by connecting rods 53, one end of each of which is eccentrically mounted on a rotatable member 54 driven by a motor 55, in the known manner.

Ambient cooling air is introduced into the interior of the hood through at least one duct 56 preferably actuated by a blower fan 57. After passing in contact with the pellets in the cooler to cool them, the heated cooling air, admixed if desired with gases discharged from the kiln and constituting a minor proportion of this mixture, leaves the far end of enclosure 48 through conduit 58, being drawn by fan 59 that discharges the air into main conduit 61. From conduit 61, branch conduits 62 conduct hot primary combustion air to the conventional burners 63, which may be fueled by oil or gas. Branch conduits 64, 65, 66 and 67 conduct hot secondary combustion air from conduit 61 to the high temperature heating zone 26. The high temperature gases resulting from combustion of the fuel with the primary and secondary combustion air in zone 26 pass through the bed of pellets on the grate, essentially completely heat hardening them. These gases, which still have considerable heat after having given up most of their heat to the pellets, then pass downdraft into the windboxes 20, from which they pass through collector main 68, duct 69, and blower fan 71 to conduit 72. Part of these hot gases pass through blower fan 73, branch conduit 73a and windboxes 18 into updraft drying zone 24, in which they pass through the layer of moist balls on the grate, being thereafter exhausted by fan 74 to the stack. Another part of these gases, which may be the remainder, pass through branch conduit 75 into the portion of the hood 17 in drying zone 25, from whence they pass downwardly through the partially dried green balls on the grate to further dry and preheat the balls, after which they pass through windboxes 19 and fan 76 to the stack. Cooling tempering air may be added as required, as by conduit 77 and fan 78 to conduit 67. Valves 79 to control gas flow may be provided in branch conduits 64–67, or in other conduits, if desired. All hot gas conduits may be insulated or refractory-lined.

A large proportion of the heat that is transmitted to the pellets on the grate and in the kiln may thus be recovered by means of the cooling air reused on the grate, while other heat remaining in the gases passed through the bed of pellets on the grate is used for drying and preheating. Therefore, there is considerable heating economy.

FIGURES 4, 5 and 6 illustrate means that may be used to advantage in the above identified apparatus for discharging hot pellets from the pallets forming the upper run of the traveling grate into the insulated chute 30 that conducts the hot pellets to the kiln, while preventing escape of such hot pellets that could cause damage or hazards to personnel.

Each of the substantially conventional pallets 5 is carried by four wheels or rollers 81, two at each end of the pallet, which travel in the track system described below. The track system comprises upper track portion 82 adapted to carry and guide the abutting pallets forming the traveling grate 16, a following upwardly-displaced track portion 83 joined to track portion 82 by forwardly-inclined portion 84; and curved track portion 85 carrying the pallets from track portion 83 around the end of the grate to the lower track portion 86 that carries the pallets in the lower path 12. The track system differs from that of conventional apparatus in that the upper portion of the track system has the elevated portion 83 and slanting inclined portion 84. The pallets 5 differ from conventional pallets in that between each sidewall 9 of each pallet and each roller 81 there is an extended portion 87 (FIGURE 6) by which each pallet can be engaged by the hooked ends 88 of puller arms 89 (FIGURES 4 and 5), one on each side of the apparatus, that positively pull the pallet up the inclined portion 84 of track system so that the hot pellets can dump from the grate into chute 30; pulling of each pallet is continued until it is on the elevated track portion 83 in a position where it can move by gravity downwardly around the curved portion 85 of the track system to the lower portion 86 of the track system as permitted by the preceding pallets. The pallets move on the lower track portion 86 in the conventional manner toward the charging end of the grate apparatus, where they are positively lifted by sprocket 15 to the upper portion 82 of the track system, where the pallets push the preceding pallets toward the discharge end in the conventional manner.

The means for providing the desired movement of each of the arms 89 generally longitudinally of the traveling grate 16 comprises a bell crank lever 91 pivotally mounted at 92 on a stationary frame 93 associated with the traveling grate apparatus, one arm 94 of lever 91 being pivotally connected to arm 89 and the other arm 95 of lever 91 being pivotally connected to a piston rod 96 of the fluid-actuated cylinder 97 pivotally mounted on frame 93. The means for providing the desired movement of each arm 89 upwardly and downwardly of the traveling grate comprises a roller 98 mounted on one arm 99 of a bell crank lever 100 that is pivotally mounted on the stationary frame 93 the other arm of which lever is actuated by a piston rod 102 of a fluid-operated cylinder 103. The roller is grooved, and adapted to engage and roll along the underside of its associated arm 89.

The arms 89 are operated in unison, either by proper timed operation of individual cylinders 97 and 103 for each arm, or by other suitable means, to coordinate the operation of the arms so that as each pallet 5 in the traveling grate is pushed by succeeding pallets to the position X shown in FIGURE 4, the arms 89 are lifted and moved rearwardly or opposite the direction of pallet travel so their hooked ends 88 are above the foremost engaging portion 87 on each side of the pallet. The arms are then moved so their ends 88 move downwardly to engage these portions 87 of the pallet as shown in FIGURE 6, and the arms are then drawn forwardly or in the direction of pallet travel, as shown in broken lines in FIGURE 4, positively to pull the pallet so it rolls upwardly on the inclined portion 84 of the track system and tilts as shown in broken lines in FIGURE 4; the arms 89 continue pulling the pallet forwardly until it reaches the position Y shown in FIGURE 4 where it can roll by gravity around the curved portion 85 of the track system. Each arm 89 then lifts to disengage from the pallet and is moved opposite the direction of pallet travel to engage the next pallet that moves into position X, the operation being repeated so long as the traveling grate is operating.

As each pallet is positively drawn forwardly by the arms 89 from position X up the inclined portion 84 of the track system, the pallet tilts toward the charging end of the upper run and in the direction opposite to the direction of pallet travel; this causes the hot pellets carried by the pallet to drop off rearwardly of the pallet into the chute 30. Moreover, any hot pellets that might spill forwardly from the disengaged side of the next succeeding pallet in position X also drop into chute 30. The upper portion of this chute is widened as shown so that it spreads below and between the free edge of the last pallet on the portion 82 and the free edge of the first pallet on portion 83 of the upper run of the track system. Therefore, the chute can capture all materials that may drop either from the tilting pallet or from the pallet in position X before tilting. The gap Z between the generally horizontal pallets in positions X and Y and through which gap the tilted pallet moves, also provides expansion room required for the substantial increase in length of the string of pallets on the track system as the pallets expand due to increase in temperature. This gap is narrower when the pallets are hot than when they are cold, but the design is such that adequate space is provided for the dumping action even though the gap is narrowed by expansion of hot pallets.

The chute, as is indicated in FIGURES 2 and 3, is inclined laterally out of the side of the discharge portion of the traveling grate apparatus to permit the chute to clear the lower pallets. Consequently, as shown in FIGURE 2, the kiln is preferably mounted so that it is offset laterally from and below the traveling grate to permit uninterrupted gravitational flow of the hot pellets from the traveling grate into the kiln.

This apparatus thus eliminates the problem that exists at the discharge ends of conventional horizontal straight grate type pelletizing machines in which the pellets are discharged from the pallets at the discharge end of the machine as the pallets tilt when passing around the curved end of the track system. In such conventional apparatus, as each pallet leaves the upper track to pass around the curved portion to the lower track, it separates by a gap from succeeding pallets. Therefore, pellets discharge forwardly, or in the direction of pallet movement, through such gap from the last pallet that has not moved into the curved portion of the track, as well as forwardly from the tilted pallets that have moved onto the curved portion of the track. Consequently, in conventional apparatus it is necessary to collect hot pellets from two points of discharge, one of which is outside the row of pallets and the other of which is inside the row of pallets. This has required the use of a quite elaborate and expensive conduit system for conveying hot pellets both inside the machine and outside the machine. While the problem of capturing and handling discharged pellets is difficult in conventional apparatus in which the pellets have cooled on the machine and are discharged at temperatures of 400° F. to 600° F., the problem would be greatly intensified in the process of the present invention in which the pellets are not cooled before being discharged from the grate and hence generally are at a temperature of between about 2350° F. and 2600° F. By the use of the features of the illustrated apparatus a single insulated conduit can receive and conduct the high temperature pellets away from the grate, and escape of hot pellets is substantially if not entirely eliminated.

The foregoing description makes apparent to those skilled in the art that the invention provides new and improved method and apparatus for producing heat hardened pellets of high quality and a high degree of uniformity of quality, which advantageously may also be sintered by fused hardened slag material that binds together constituents of the pellet structure for added strength and stability. To increase the sintering properties of the material of which the green balls are formed, there may be added to the ball material other finely divided ingredients to form in combination with themselves or other ingredients in the ball material a low melting point eutectic component that can form a molten slag that can bind constituents of the balls together in sintering. The nature and amounts of such added ingredients will depend on the composition of the ores or other materials in the mix, and may include one or more of lime, limestone, dolomite, silica sand, or other suitable finely divided materials.

The reducing conditions in the kiln that promote sintering in the kiln may be obtained by operation of the burner supplying heat to the kiln to maintain reducing conditions, or by charging into the kiln solid reductant such as particles of coal, coke, peat, certain solid carbonaceous industrial wastes, or liquid reductant such as residual fuel oils, which upon being heated with the proper lean proportions of air will produce the desired reducing atmosphere.

If the pellets produced according to the invention are iron oxide pellets, they may be used in a blast furnace or other apparatus in which their iron content is effectively converted to metallic iron, without dimensional instability or disintegration of the pellets and excessive waste of iron units in the flue dust.

In the claims, the term "green balls" is intended to mean agglomerates of pelletizable material that have not been heat hardened, such as ores or ore concentrates exemplified by iron flue dust, etc., which agglomerates are made by rolling procedures such as balling, extrusion and severing, briquetting, or compacting procedures; and the term "pellets" is intended to mean the product produced by heat hardening such green agglomerates according to the present invention. However, particular benefits are provided when the green balls are generally spherical agglomerates made by balling procedures.

It will be apparent to those skilled in the art that the disclosed method and apparatus may be modified in various manners, other than those indicated, without departing from the spirit of the invention, and that they may provide advantages other than those indicated. It is intended that the patent shall cover, by suitable expression in the appended claims, whatever features of patentable novelty reside in the invention.

What is claimed is:

1. The method of producing hard, dense, discrete pellets from finely divided iron oxide material, comprising the steps of making individual green balls of preselected size out of said finely divided iron oxide material; forming said green balls into a movable body in which said balls are at rest relative to each other; conveying said body of green balls through an indurating zone in which said green balls are subjected to pelletizing conditions including high temperature of between about 2350° F. and about 2600° F. and oxidizing atmosphere sufficient to convert said green balls into heat hardened pellets in which are essentially completed essentially all oxide conversions, recrystallizations and grain growth that result in the formation of completely heat hardened pellets; discharging said hot heat hardened pellets without cooling from said body into a tumbling zone; tumbling said pellets through said tumbling zone to move said pellets relative to each other and at a rate to maintain the movement of said pellets in said tumbling zone relative to the movement of pellets through and discharged from said indurating zone; and maintaining indurating temperatures in said tumbling zone while said pellets are being tumbled therein while maintaining said pellets in said tumbling zone for a period sufficient to render said pellets essentially uniform as to hardness before they leave said zone.

2. The method of claim 1 in which said green balls while in said movable body are conducted through a drying zone in which they are subjected to drying by heated gases.

3. The method of claim 1 in which after said hot pellets leave said tumbling zone they pass through a cooling zone in which they are cooled by air in contact with said pellets and the cooling air becomes heated, and in which method said heated cooling air is passed to said indurating zone.

4. The method of claim 3 in which the hot gases in said indurating ozne, after heating said pellets are passed to said body of green balls before it passes through said indurating zone to predry said balls in said body before they pass through the indurating zone.

5. The method of claim 1 in which said green balls are formed of finely divided iron ore and said bed of balls is gas permeable, and in which said pellets in said tumbling zone are subjected to temperatures between about 2350° F. and about 2600° F.

6. The method of claim 5 in which said green balls prior to passing through said indurating zone are subjected to temperatures of between about 400° F. and about 850° F. by hot gases passing through said body to predry said green balls.

7. The method of claim 5 in which said iron ore pellets are discharged from said tumbling zone into a cooling zone in which they are cooled by air in contact with said pellets, which air thereby becomes heated, and in which method cooling air at a temperature between about 400° F and 850° F. is supplied to said indurating zone.

8. The method of claim 7 in which the hot gases produced in said indurating zone are passed through the body of green balls in said zone to convert them to heat hardened pellets and in which the hot gases collected after having passed through said are then passed through said body of green balls in a drying zone preceding said indurating zone.

9. The method of claim 4 in which part of said hot gases are passed updraft through said body in a drying zone, and part of said hot gases are passed downdraft through said body of green balls in a drying zone.

10. The method of claim 1 in which indurating temperatures sufficient to cause sintering of said pellets are maintained in said tumbling zone.

11. The method of claim 1 in which indurating temperatures sufficient to cause sintering of said pellets are maintained in said indurating zone.

12. The method of claim 1 in which indurating temperatures sufficient to cause sintering of said pellets are maintained in said indurating zone and said tumbling zone.

13. The method of claim 1 in which a reducing atmosphere is maintained in said tumbling zone.

14. The method of claim 1 in which a reducing atmosphere is maintained in said tumbling zone by burning of fuel in a lean air mixture.

15. Apparatus for producing pellets comprising a traveling grate comprising a moving permeable bottom; a charging location on said grate; a discharging location on said grate spaced from said charging location; means for depositing a layer of green balls of pelletizable material on said traveling grate as its travels from its charging location toward its discharging location; means defining a drying zone through which said traveling grate travels after it leaves said charging location; means defining an indurating zone through which said traveling grate travels after it leaves said drying zone and before it reaches said discharging location; burner means for burning fuel in combustion air in said indurating zone for supplying hot products of combustion to which said green balls in said indurating zone are exposed to convert said green balls into heat hardened pellets in which are essentially completed essentially all oxide conversions, recrystallizations and grain growth that result in formation of completely heat hardened pellets; means at said discharging location for discharging hot pellets without cooling from said grate after they pass through said indurating zone; a rotating kiln into one end of which said hot pellets pass from said discharging means without appreciable cooling; additional burner means located adjacent the end of said kiln into which said hot pellets are discharged from said grate for supplying hot products of combustion to which said pellets in said kiln are exposed while they pass through said kiln, whereby said hot products of combustion discharged by said last mentioned burner means and said pellets pass through said kiln in the same direction; and cooling means into which said pellets are discharged after they leave said kiln and in which they are cooled.

16. The apparatus of claim 15 comprising means for passing cooling air in contact with said pellets in said cooling zone and for discharging cooling air therefrom; and means for passing heated cooling air from said cooling zone to said indurating zone for combustion air.

17. The apparatus of claim 16 comprising means for passing hot combustion gases resulting from burning of fuel in said indurating zone through said layer of pellets on the grate in said indurating zone, and then passing such gases through the layer of balls on the grate in said drying zone.

18. The apparatus of claim 15 comprising means for passing said combustion gases in said indurating zone through said layer of balls on said grate to heat them and convert them to heat hardened pellets; means for passing a portion of said hot combustion gases, after they have passed through said layer of balls on said grate, through a drying zone and passing them updraft through said balls on said grate; means for passing another portion of said hot combustion gases after they have passed through said layer of balls on said grate through another drying zone and passing them downdraft through said balls on said grate; means for passing cooling air in contact with the hot pellets in said cooling means and thereby heating said air; and means for passing said heated cooling air to said indurating zone for use as combustion air.

References Cited

UNITED STATES PATENTS

| | | | |
|---|---|---|---|
| 2,112,566 | 3/1938 | Hasselbach | 75—36 |
| 2,855,290 | 10/1958 | Freeman | 75—33 |
| 2,925,336 | 2/1960 | Stowasser | 75—3 |
| 3,163,519 | 12/1964 | Hanson et al. | 75—3 |
| 3,172,754 | 3/1965 | Anthes et al. | 75—5 |
| 3,215,521 | 11/1965 | Meyer et al. | 75—5 |
| 3,244,507 | 4/1966 | Linney | 75—5 |

RICHARD O. DEAN, *Primary Examiner.*

U.S. Cl. X.R.

266—21